(12) United States Patent
Kwon et al.

(10) Patent No.: US 9,729,283 B2
(45) Date of Patent: Aug. 8, 2017

(54) SYSTEMS, METHODS AND DEVICES FOR FLEXIBLE RETRANSMISSIONS

(71) Applicant: Intel IP Corporation, Santa Clara, CA (US)

(72) Inventors: Hwan-Joon Kwon, Santa Clara, CA (US); Youn Hyoung Heo, Seoul (KR); Seunghee Han, Cupertino, CA (US); Jong-Kae Fwu, Sunnyvale, CA (US); Hong He, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 78 days.

(21) Appl. No.: 14/582,492

(22) Filed: Dec. 24, 2014

(65) Prior Publication Data

US 2015/0327275 A1 Nov. 12, 2015

Related U.S. Application Data

(60) Provisional application No. 61/990,692, filed on May 8, 2014.

(51) Int. Cl.
*H04W 72/04* (2009.01)
*H04L 5/00* (2006.01)
(Continued)

(52) U.S. Cl.
CPC ............... *H04L 5/001* (2013.01); *H04L 1/18* (2013.01); *H04L 5/0055* (2013.01);
(Continued)

(58) Field of Classification Search
CPC ...................................................... H04L 5/001
See application file for complete search history.

(56) References Cited

U.S. PATENT DOCUMENTS

| | | | |
|---|---|---|---|
| 8,625,652 B2* | 1/2014 | Chen | H04L 1/1887 375/130 |
| 2006/0171353 A1* | 8/2006 | Nagata | H04B 7/04 370/329 |

(Continued)

FOREIGN PATENT DOCUMENTS

| | | |
|---|---|---|
| WO | 2013087835 A1 | 6/2013 |
| WO | 2013103274 A1 | 7/2013 |
| WO | 2013162261 A1 | 10/2013 |

OTHER PUBLICATIONS

PCT/US2015/025431, International Search Report and Written Opinion, Jul. 21, 2015, 20 pages.

*Primary Examiner* — Parth Patel
(74) *Attorney, Agent, or Firm* — Stoel Rives LLP

(57) ABSTRACT

A hybrid automatic repeat request (HARQ) process enables a retransmission to be sent on a carrier (or medium, set of frequencies, band, etc.) different from the carrier on which the previous transmissions (initial transmission and/or retransmissions) were sent. An enhanced HARQ process can improve system performance by aiding user throughput, system throughput, and delay performance by making retransmissions possible even when the unlicensed band is not available (e.g., when occupied by other RATs or the same RAT deployed by another operator). For example, a transmitter sends a subpacket in an unlicensed band. The receiver feeds back a NACK to the transmitter due to the packet decoding failure. If the medium is not idle, the transmitter sends the retransmission in another band or another channel that can be either a licensed band/channel or another unlicensed band/channel. The retransmission can be sent in multiple licensed and/or unlicensed bands/channels at the same time.

18 Claims, 9 Drawing Sheets

US 9,729,283 B2

Page 2

(51) Int. Cl.
*H04W 28/08* (2009.01)
*H04L 1/18* (2006.01)
*H04W 74/08* (2009.01)

(52) U.S. Cl.
CPC ..... *H04W 28/085* (2013.01); *H04W 72/0486* (2013.01); *H04W 74/0808* (2013.01)

(56) References Cited

U.S. PATENT DOCUMENTS

| | | | |
|---|---|---|---|
| 2006/0251031 A1* | 11/2006 | Anderson | H04L 1/0041 370/338 |
| 2007/0002786 A1* | 1/2007 | Herrmann | H04L 1/1819 370/328 |
| 2007/0263702 A1* | 11/2007 | Kwon | H04L 1/1812 375/135 |
| 2008/0084835 A1* | 4/2008 | Goel | H04W 74/0808 370/310 |
| 2008/0144572 A1* | 6/2008 | Makhijani | H04L 1/1887 370/330 |
| 2008/0151849 A1* | 6/2008 | Utsunomiya | H04W 72/0486 370/338 |
| 2009/0005058 A1* | 1/2009 | Kazmi | H04W 16/10 455/452.1 |
| 2009/0103440 A1* | 4/2009 | Wang | H04L 1/1812 370/237 |
| 2009/0196249 A1* | 8/2009 | Kawamura | H04B 1/7143 370/330 |
| 2009/0199061 A1* | 8/2009 | Lee | H04L 1/1812 714/748 |
| 2009/0276674 A1* | 11/2009 | Wei | H04L 1/16 714/749 |
| 2009/0285116 A1* | 11/2009 | Nanda | H04W 72/02 370/252 |
| 2010/0054137 A1* | 3/2010 | Deng | H04B 7/15592 370/247 |
| 2010/0107028 A1* | 4/2010 | Gorokhov | H04L 5/0035 714/748 |
| 2010/0265408 A1* | 10/2010 | Katsube | H04L 1/18 348/723 |
| 2010/0318871 A1* | 12/2010 | Lee | H04L 1/0038 714/749 |
| 2010/0322173 A1* | 12/2010 | Marinier | H04W 76/048 370/329 |
| 2011/0044302 A1* | 2/2011 | Toshimitsu | H04W 72/02 370/338 |
| 2011/0051666 A1* | 3/2011 | Kim | H04L 1/0004 370/328 |
| 2011/0249619 A1* | 10/2011 | Yu | H04B 7/024 370/328 |
| 2011/0314145 A1* | 12/2011 | Raleigh | H04L 41/0893 709/224 |
| 2012/0140714 A1* | 6/2012 | Koskela | H04W 56/00 370/329 |
| 2012/0163357 A1* | 6/2012 | Won | H04L 1/1671 370/338 |
| 2012/0250631 A1* | 10/2012 | Hakola | H04L 5/001 370/329 |
| 2012/0263052 A1* | 10/2012 | Dai | H04L 5/001 370/252 |
| 2012/0307744 A1* | 12/2012 | Charbit | H04W 72/1205 370/329 |
| 2012/0327783 A1* | 12/2012 | Moon | H04L 1/1861 370/241 |
| 2012/0327886 A1* | 12/2012 | Yu | H04W 72/042 370/329 |
| 2013/0021920 A1* | 1/2013 | Nakao | H04L 1/0027 370/242 |
| 2013/0163406 A1* | 6/2013 | Oizumi | H04L 1/0061 370/216 |
| 2013/0163543 A1* | 6/2013 | Freda | H04W 72/0406 370/329 |
| 2013/0170457 A1 | 7/2013 | Pelletier et al. | |
| 2013/0170469 A1* | 7/2013 | Yu | H04L 1/0003 370/330 |
| 2013/0194981 A1* | 8/2013 | Wang | H04L 1/1671 370/280 |
| 2013/0242754 A1* | 9/2013 | Shaikh | H04W 24/04 370/242 |
| 2013/0294223 A1* | 11/2013 | Yoon | H04L 1/1893 370/216 |
| 2013/0322358 A1 | 12/2013 | He et al. | |
| 2014/0071931 A1* | 3/2014 | Lee | H04L 5/001 370/329 |
| 2014/0092784 A1* | 4/2014 | Khayrallah | H04L 1/1887 370/280 |
| 2014/0140316 A1* | 5/2014 | Nagata | H04J 11/0053 370/329 |
| 2014/0204892 A1* | 7/2014 | Oizumi | H04L 1/00 370/329 |
| 2014/0245095 A1* | 8/2014 | Nammi | H04L 1/1845 714/749 |
| 2014/0301354 A1* | 10/2014 | Davydov | H04W 76/00 370/330 |
| 2014/0335876 A1* | 11/2014 | Ratasuk | H04W 16/14 455/450 |
| 2015/0009954 A1* | 1/2015 | Chang | H04L 25/00 370/330 |
| 2015/0043395 A1* | 2/2015 | Dai | H04L 5/0037 370/280 |
| 2015/0063134 A1* | 3/2015 | Rajkotia | H04L 12/413 370/252 |
| 2015/0063148 A1* | 3/2015 | Sadek | H04W 16/14 370/252 |
| 2015/0222406 A1* | 8/2015 | Zheng | H04L 1/1685 370/329 |
| 2015/0249972 A1* | 9/2015 | You | H04L 5/001 370/254 |
| 2015/0256303 A1* | 9/2015 | Belghoul | H04L 5/006 370/329 |
| 2015/0264697 A1* | 9/2015 | Fong | H04W 72/0406 370/329 |
| 2015/0289208 A1* | 10/2015 | Liu | H04L 1/1887 370/252 |
| 2015/0351061 A1* | 12/2015 | Kim | H04W 56/00 370/252 |
| 2015/0358100 A1* | 12/2015 | Jung | H04J 11/005 370/329 |
| 2015/0358998 A1* | 12/2015 | Golitschek Edler Von Elbwart | H04W 48/12 370/280 |
| 2016/0044690 A1* | 2/2016 | Li | H04W 52/0209 370/329 |
| 2016/0073268 A1* | 3/2016 | Krunz | H04W 16/14 370/329 |
| 2016/0337092 A1* | 11/2016 | Yang | H04L 1/1874 |

* cited by examiner

SYSTEMS, METHODS AND DEVICES FOR FLEXIBLE RETRANSMISSIONS

RELATED APPLICATION

This application claims the benefit under 35 U.S.C. §119(e) of U.S. Provisional Application No. 61/990,692 filed May 8, 2014, which is incorporated by reference herein in its entirety.

TECHNICAL FIELD

The present disclosure relates to wireless transmissions and more specifically to retransmission of data on a carrier different than the original transmission.

DETAILED DESCRIPTION OF PREFERRED EMBODIMENTS

Figure 1:
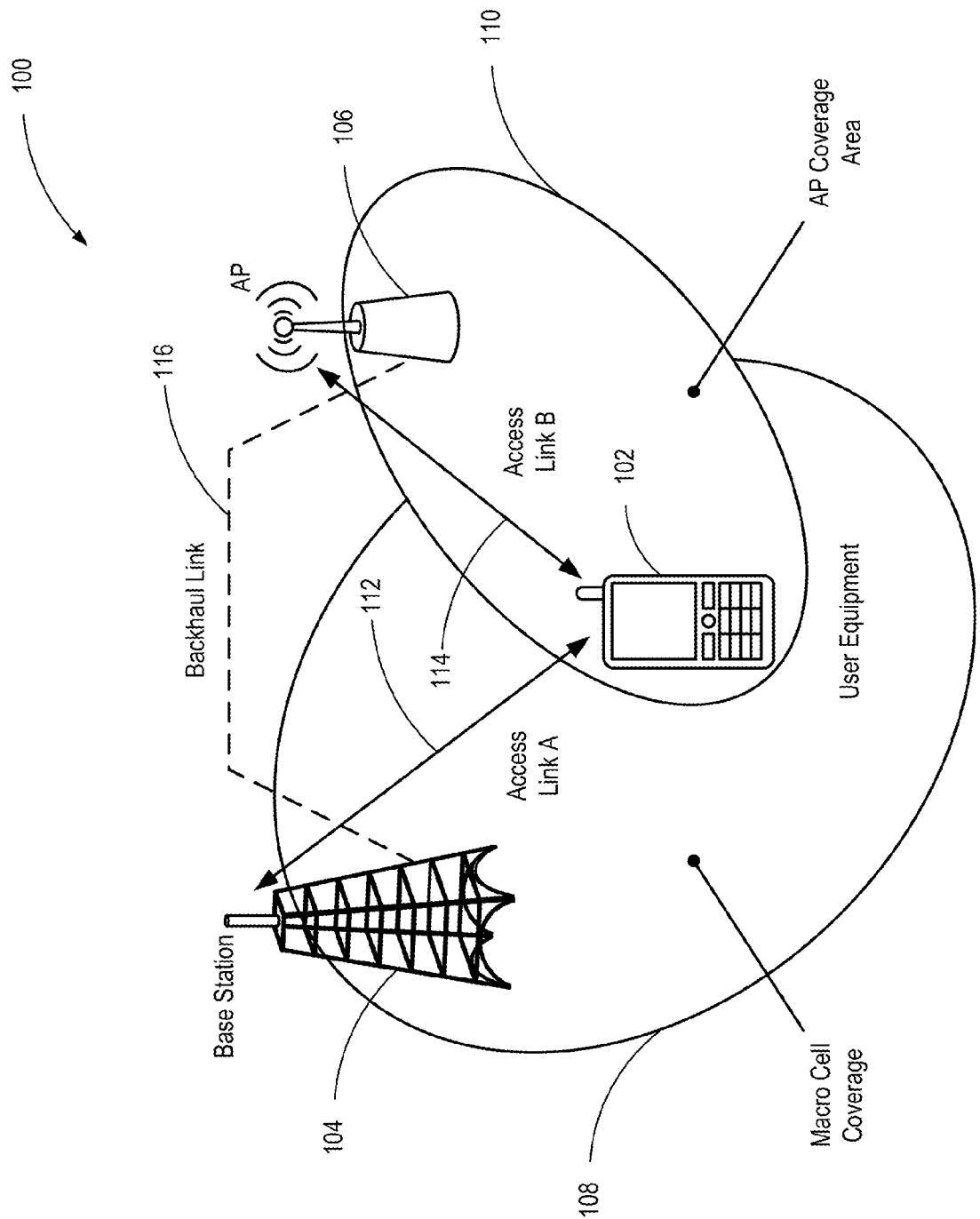
FIG. 1 is a system diagram illustrating a retransmission system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a hybrid automatic repeat request (HARQ) process where a retransmission can be sent on a carrier (or medium, set of frequencies, band, etc.) different from the carrier on which the previous transmissions (initial transmission and/or retransmissions) were sent. An enhanced HARQ process can improve system performance by aiding user throughput, system throughput, and delay performance by making retransmissions possible even when the unlicensed band is not available (e.g., when occupied by other RATs or the same RAT deployed by another operator).

For example, an LTE-U transmitter sends a subpacket in an unlicensed band that can be either an initial transmission or a retransmission. The LTE-U receiver feeds back ACK or NACK to the transmitter depending on the packet decoding result. If NACK, the transmitter determined whether the medium is idle. If idle, the retransmission can be in the same band. If not idle, the transmitter sends the retransmission in another band or another channel that can be either a licensed band/channel or another unlicensed band/channel. In an embodiment, the retransmission can be sent in multiple licensed and/or unlicensed bands/channels at the same time.

In some embodiments, the configuration of retransmissions can be static or semi-static. For example, bands carrying retransmissions can be predefined in the specification (static method) or can be semi-statically configured through a higher layer signaling (e.g., RRC signaling).

In an embodiment, a downlink control format information (DCI) format can be added that aids in describing retransmitted data. For example, the DCI format can include fields indicating a component carrier (CC) for an assigned transmission for a HARQ operation, a CC where the assigned physical downlink shared channel (PDSCH) transmission is intended, an indicator of whether data is new or retransmitted and/or a HARQ process number.

A conventional LTE system utilizes spectrum that is exclusively assigned to the corresponding LTE service provider (or operator), referred to as LTE in Licensed Spectrum (LTE). However, demand for wireless broadband data can saturate LTE systems. An increased data throughput of an LTE system can be accomplished by transmitting data through unlicensed spectrum as well as licensed spectrum. The LTE system operating in unlicensed spectrum is often referred to as LTE in Unlicensed Spectrum (LTE-U) or licensed assisted access (LAA). Different from the conventional LTE, LTE-U can share a medium (or spectrum) with other radio access technologies (RATs) such as IEEE 802.11x (wireless local area network (WLAN) also known as Wi-Fi) or the same RAT (i.e., LTE-U) deployed by other operators. For instance, when the medium is being used by WLAN, LTE-U can wait until the medium is idle.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi (or WLAN). Mobile broadband networks can include various high speed data technologies, such as 3GPP LTE systems. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Turning to FIG. 1, an example of a portion of a radio access network (RAN) system 100 that includes a single cellular air interface (such as an LTE/LTE-Advanced access link) being provided between the base station 104 and the UE 102 (i.e. on Access Link A), and an air interface (a supplemental network interface such as a wireless local area network (WLAN) based interface) being provided between the access point (AP) 106 and the UE 102 (i.e. on Access Link B). UE 102 is located in within macro cell coverage 108. The UE 102 determines that connection with a WLAN AP 106 will be beneficial to a user of the UE 102. In some embodiments, the UE 102 retains Access Link A to base station 104. The UE 102 can offload some or part of wireless services onto Access Link A. In other embodiments, the UE 102 disconnects from Access Link A and moves all wireless services to Access Link B. In some embodiments Access Link A and Access Link B use a same frequency and technology. In other embodiments, Access Link A and Access Link B use different frequencies (e.g. LTE licensed frequencies and unlicensed frequencies) and different link technology (e.g. LTE and Wi-Fi). In other embodiments, Access Link A and Access Link B use different frequencies and the similar link technology (e.g. LTE and LTE over mmWave).

Figure 2:
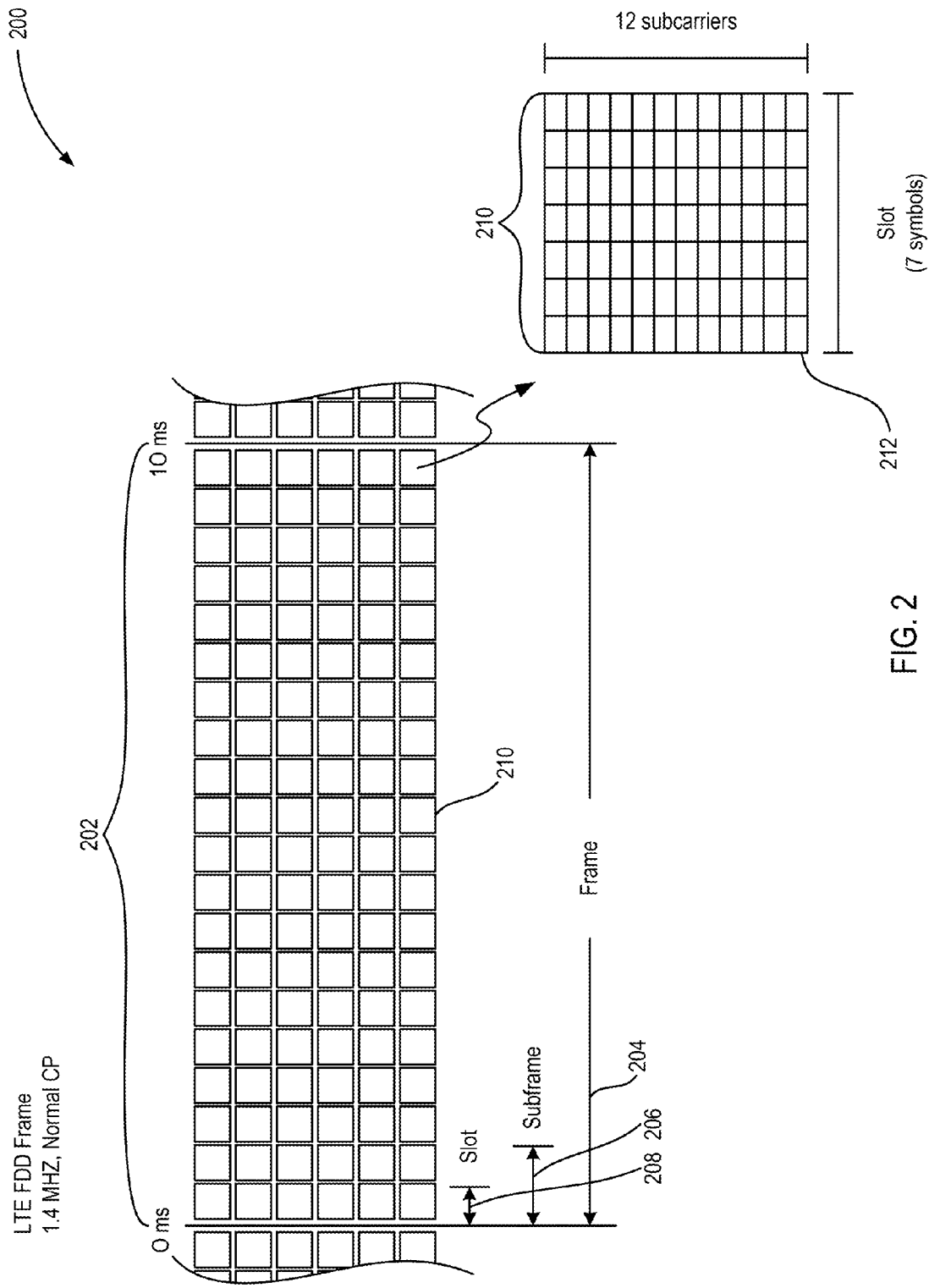
FIG. 2 is a diagram illustrating a long term evolution (LTE) frame consistent with embodiments disclosed herein.

FIG. 2 is a schematic diagram 200 illustrating long term evolution (LTE) communication frame 204 of 10 ms duration 202. In one embodiment, each frequency allocation (carrier) can be in 108 kHz increments. In the diagram shown, a minimum of six carriers are shown. This allows for a bandwidth of 1.08 MHz (six carriers times 180 kHz=1.08 MHz bandwidth). In some embodiments, the carriers can be expanded to 110 blocks (110 carriers times 180 kHz=19.8 MHz). Frame 204 can be 10 ms with each slot 208 being 0.5 ms (and each subframe 206 being 1 ms).

Slot 208 at a carrier is resource block 210, which includes seven symbols at 12 orthogonal frequency-division multiplexing (OFDM) subcarriers. Resource element 212 is one OFDM subcarrier for the duration of one OFDM symbol. Resource block 210 can include 84 resource elements 212 when using a normal cyclic prefix (CP). OFDM spacing between individual subcarriers in LTE can be 15 kHz. A guard period of a CP can be used in the time domain to help prevent multipath inter-symbol interference (ISI) between subcarriers. The CP can be a guard period before each OFDM symbol in each subcarrier to prevent ISI (such as due to multipath).

HARQ (Hybrid Automatic Repeat reQuest)

HARQ is a combination of forward error-correcting coding and ARQ (automatic repeat request) error-control. HARQ can aid when channel status information (CSI) at the transmitter is not accurate. For example, the CSI at the transmitter is different from the channel/interference status experienced by the actual packet transmission.

Figure 3:
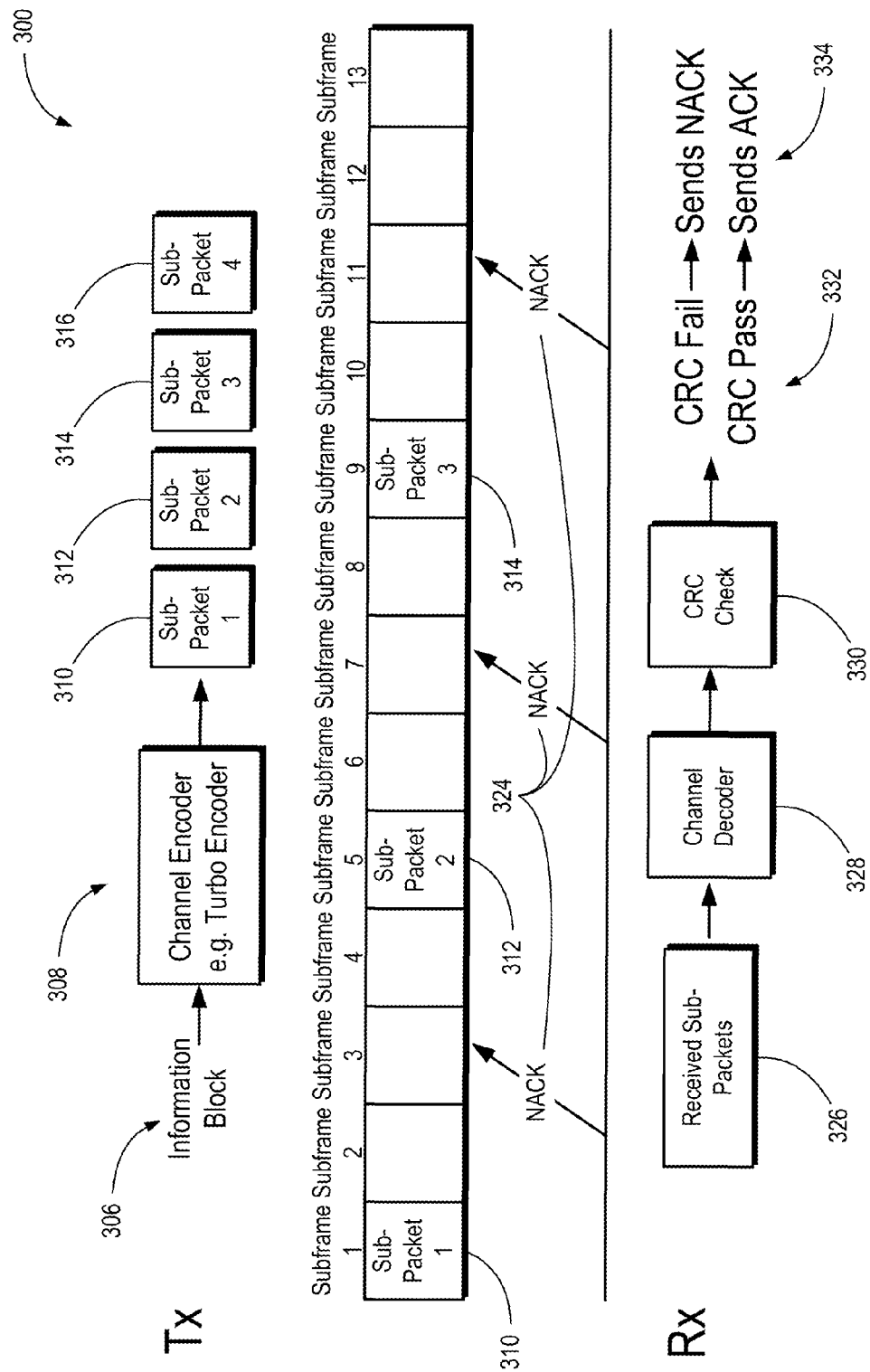
FIG. 3 is a block diagram of a hybrid automatic repeat request consistent with embodiments disclosed herein.

FIG. 3 illustrates a HARQ process. In the example shown, four sub-packets 310, 312, 314 and 316 (i.e., four redundancy versions in LTE) are defined for each encoded packet (called a code block or information block 306 in LTE) encoded by a channel encoder 308 (e.g., turbo encoder) and one of the four sub-packets is transmitted at one subframe. When a subpacket is received 326, it is put through a channel decoder 328 and a CRC check 330. The CRC is checked 332. If the CRC passes, an ACK is sent 334. If the CRC does not pass (e.g., is deficient), a NACK is sent 334. In the example shown, subpacket 1 (310) is sent on subframe 1 and a NACK is sent on subframe 3. Subpacket 2 (312) is sent on subframe 5 and a NACK is sent on subframe 7. Subpacket 3 (314) is sent on subframe 9 and a NACK is sent on subframe 11.

Note that in this example the time difference between consecutive subpacket transmissions is four subframes in this example of HARQ (other systems may vary). In some LTE systems, the time difference is 8 subframes in the uplink (UL) and 8 or more in the downlink (DL). The HARQ scheme in which the time difference is fixed as in the LTE UL is called synchronous HARQ, while the HARQ scheme in which the time difference is flexible as in the LTE DL is called asynchronous HARQ.

Figure 4:
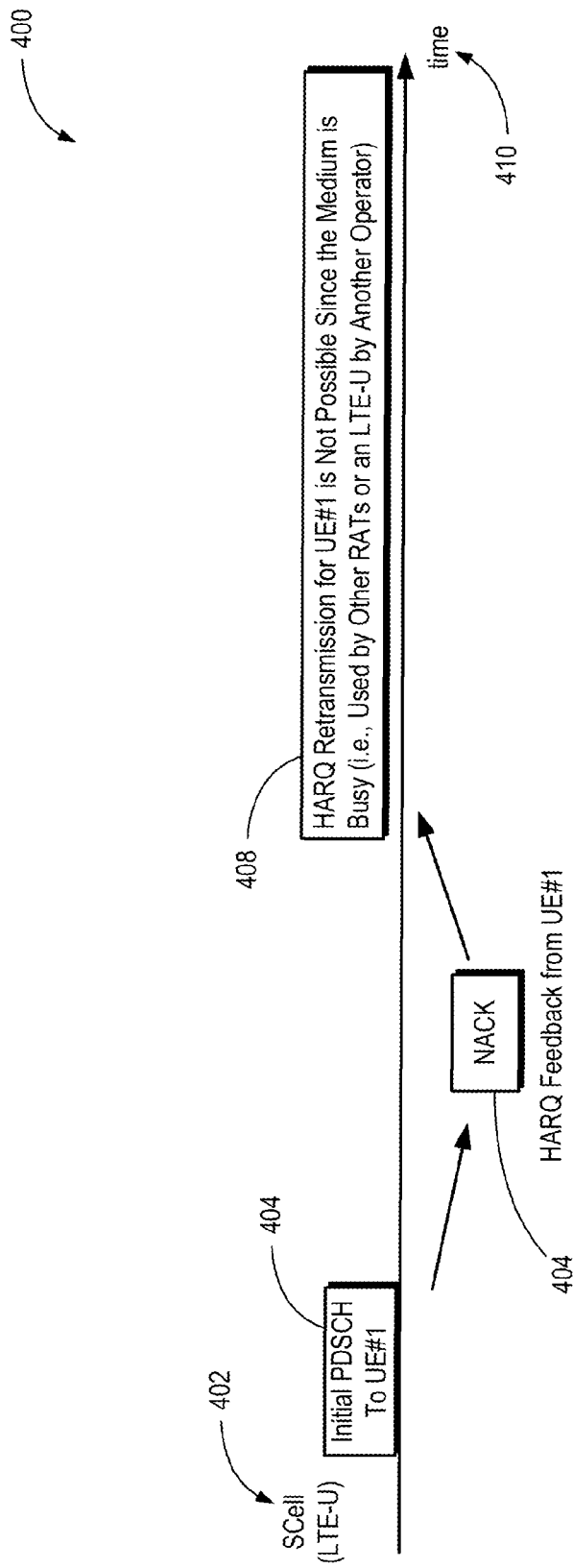
FIG. 4 is a block diagram illustrating a blocked retransmission consistent with embodiments disclosed herein.

In FIG. 4, an LTE-U transmitter (eNB in the DL or UE in the UL) sends an initial transmission 404 and receives a NACK 404 from the receiver. The transmitter can be obligated to send a retransmission. In the uplink, a retransmission can be performed 8 ms after the initial transmission. Although in the DL the retransmission can happen longer than 8 ms after the initial transmission, latency reduction dictates an earlier response. If the medium is being used by other RATs when a retransmission is needed (e.g., busy 408), the transmitter may not be able to send the retransmission, as illustrated in FIG. 4. In some embodiments, synchronous HARQ may not work in conjunction with LTE-U. Even with asynchronous HARQ, it may not be desirable to wait a long time for the retransmission until the medium becomes idle. A more flexible HARQ process can aid in reduction of latency in a shared medium.

A HARQ process can be used in a shared carrier, where a retransmission can be sent on a carrier (or band) different from the carrier (or band) on which the previous transmissions (initial transmission and/or retransmissions) were sent. Various detailed embodiments and enabling signalings are described below. The proposed HARQ process can improve the system performance such as user throughput, system throughput, and delay performance by making retransmissions possible when the unlicensed band is not available (e.g., when occupied by other RATs or a same RAT deployed by another operator).

HARQ Operation for an LTE-U UE

Figure 5:
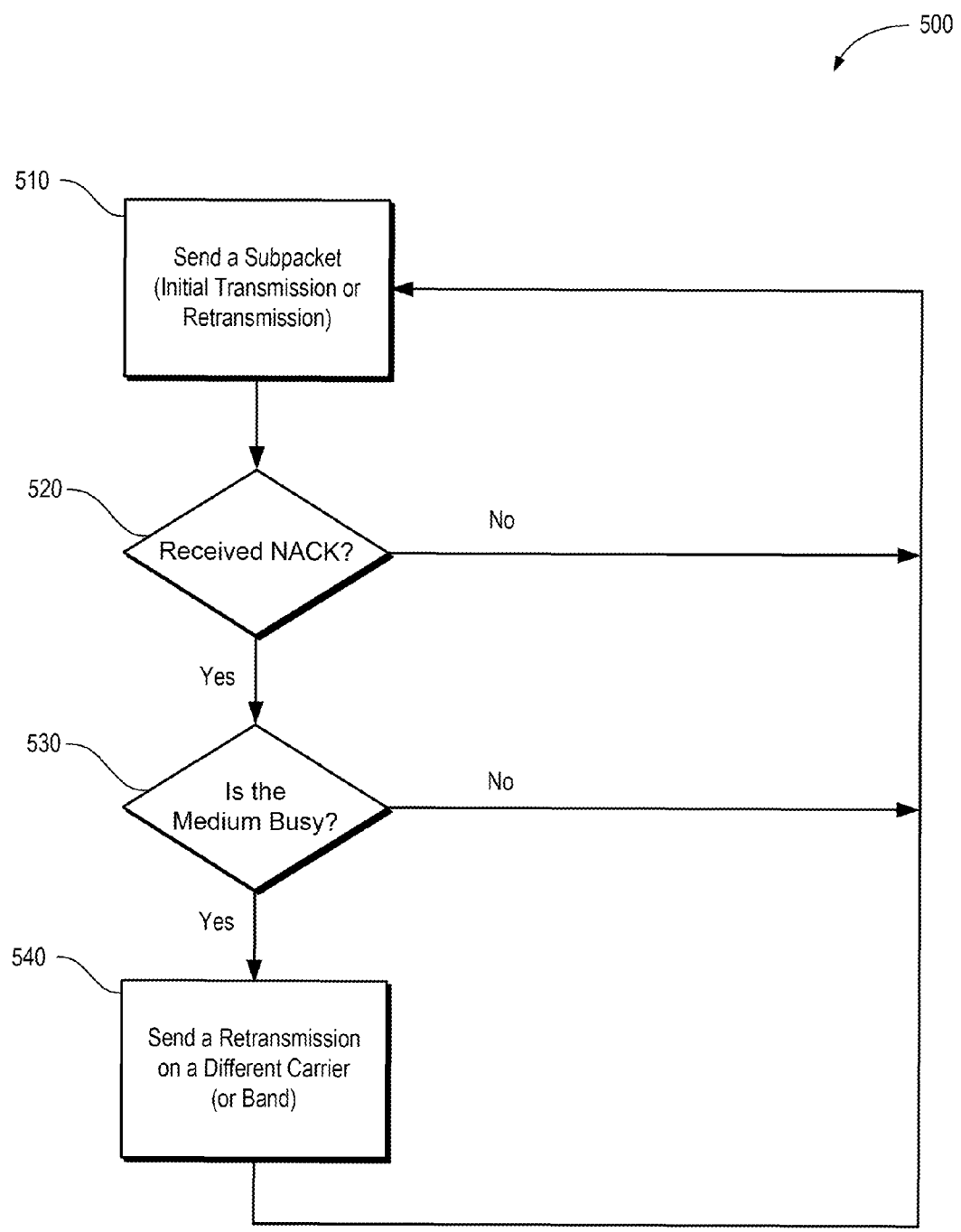
FIG. 5 is flow chart illustrating a flexible HARQ method consistent with embodiments disclosed herein.
Figure 6:
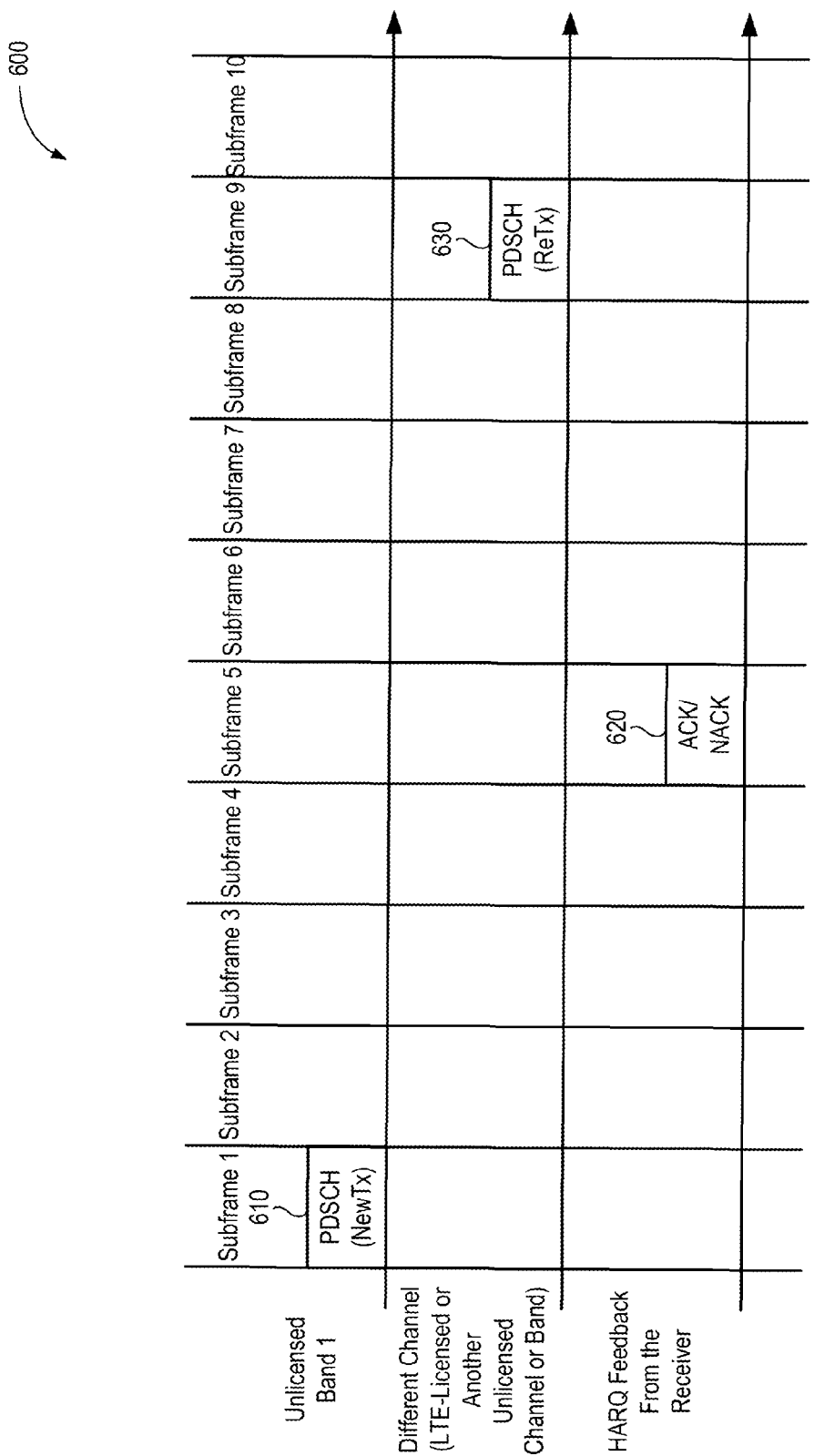
FIG. 6 is a diagram of flexible HARQ consistent with embodiments disclosed herein.

FIGS. 5 to 6 show a method of a HARQ retransmission and an application of the method of HARQ retransmission.

Turning to FIG. 5, an adaptive listen before talk (LBT) is illustrated. In block 510, the LTE-U transmitter sends a subpacket in an unlicensed band that can be either an initial transmission or a retransmission. In block 520, the LTE-U receiver feeds back ACK or NACK to the transmitter depending on the packet decoding result (see, e.g., FIG. 3 for description about ACK and NACK). If the transmitter receives ACK, the process returns to block 510 and sends an initial transmission of a new encoder packet in which a time instance is determined by the scheduler according to a scheduling algorithm. However, if the transmitter receives NACK, it goes to block 530. In block 530, the transmitter determined whether the medium (such as an unlicensed band) is idle or not in a certain method (e.g., sensing the medium through energy detection and/or preamble detection). If the unlicensed band is considered to be idle, the transmitter goes to block 510 and send a retransmission in the same unlicensed band. However, if the medium (unlicensed band) is considered to be busy, the transmitter goes to block 540. In block 540, the transmitter sends the retransmission in another band or another channel that can be either a licensed band/channel or another unlicensed band/channel. In an embodiment, the retransmission can be sent in multiple licensed and/or unlicensed bands/channels at the same time. If the retransmission is sent in another unlicensed band/channel, it can be preceded by a medium sensing.

In an embodiment, block 530 can be omitted from FIG. 5. Instead, the bands carrying retransmissions can be predefined in the configuration (static method) or can be semi-statically configured through a higher layer signaling (e.g., RRC signaling). In one embodiment, retransmissions are always sent through a licensed band. For example, when the number of the activated licensed bands is one, retransmissions are always are sent through the licensed band.

Turning now to FIG. 6, a more detailed HARQ operation that follows the above process is illustrated. In the figure, an initial transmission is sent in unlicensed band 1 at subframe 1, as indicated by reference number 610. At subframe 5, the receiver sends 'NACK' to the transmitter, as indicated by reference number 620. At subframe 9, the transmitter sends a retransmission in the licensed band or in another unlicensed band, as indicated by reference number 630.

Figure 7:
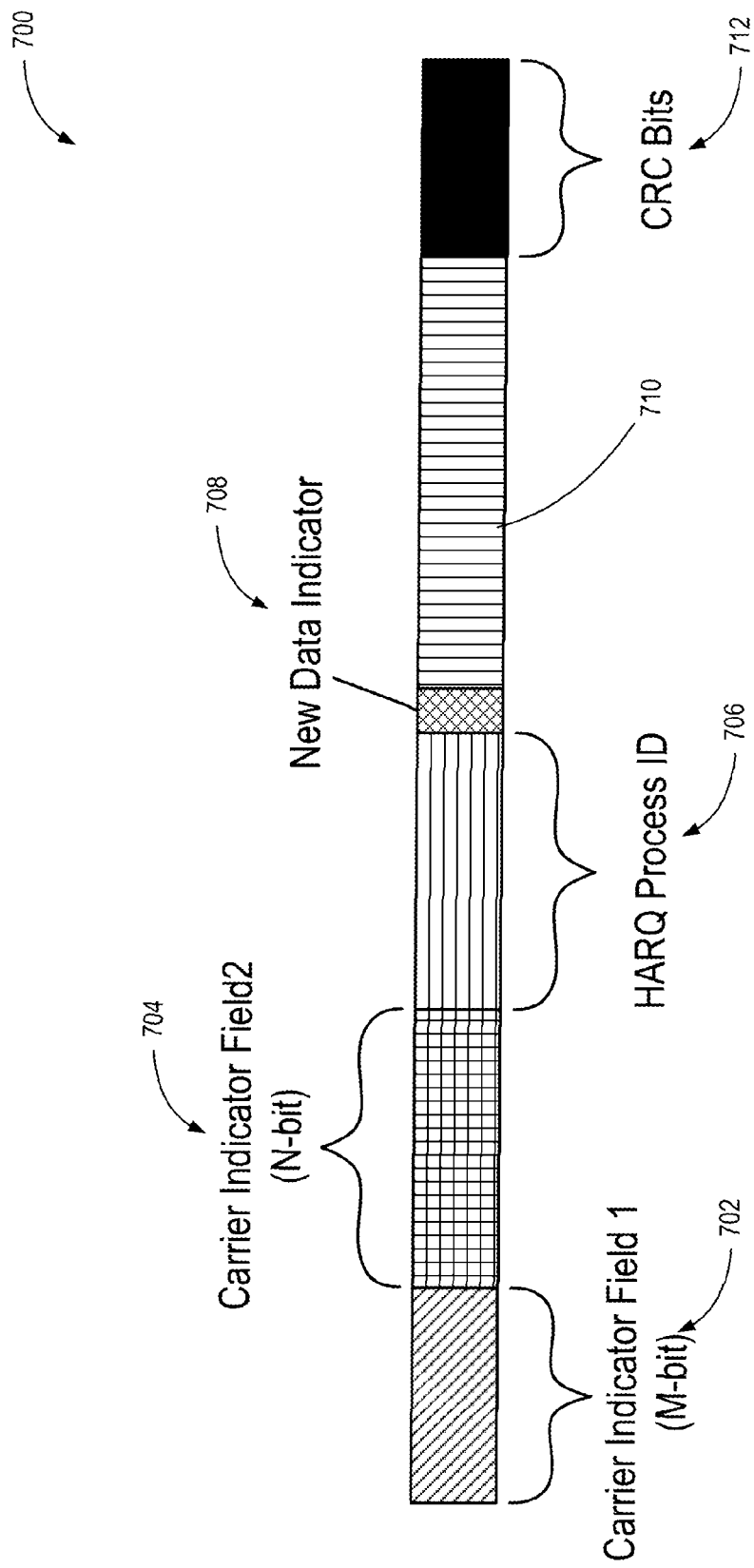
FIG. 7 is an illustration of a downlink control format information (DCI) format consistent with embodiments disclosed herein.
Figure 8:
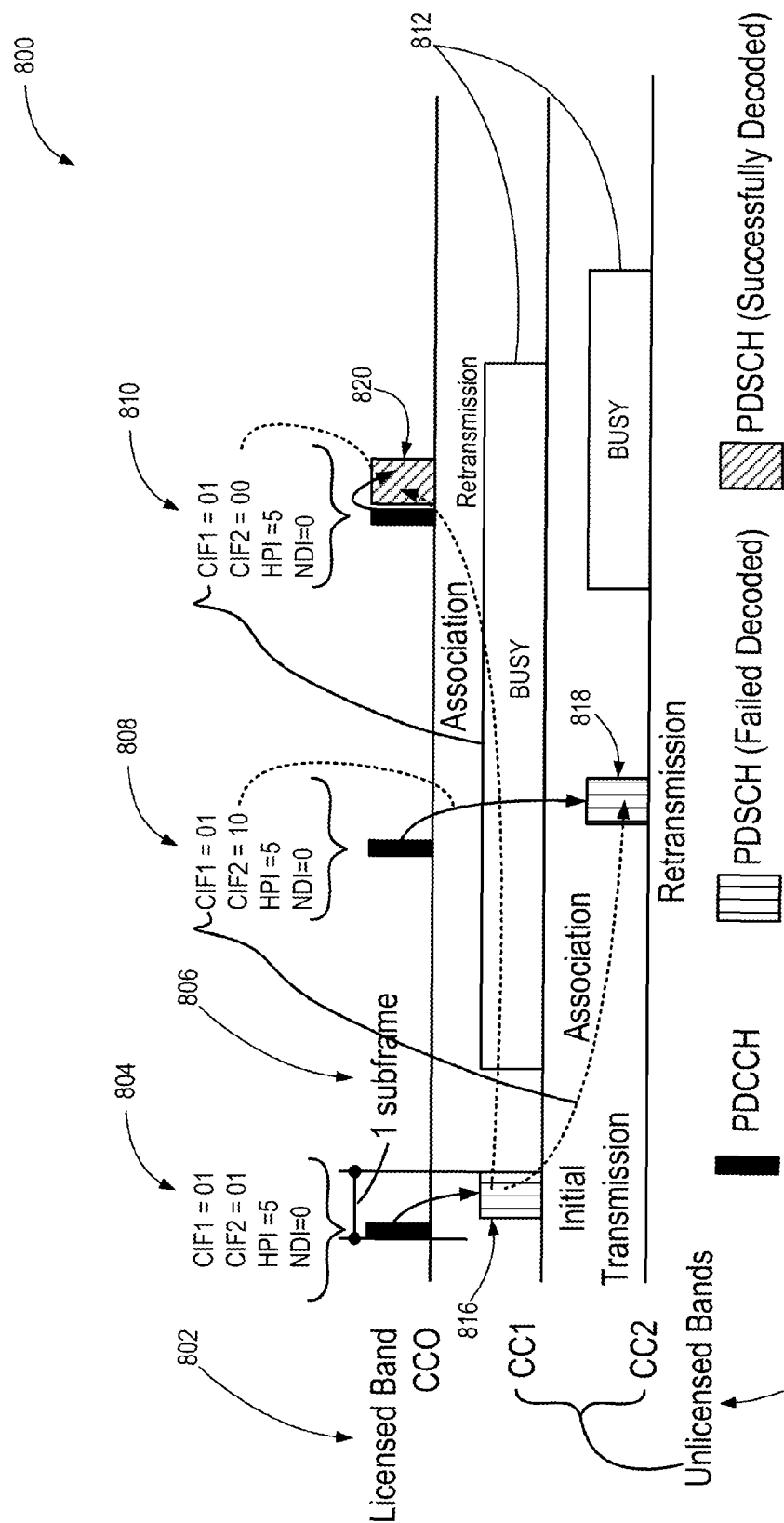
FIG. 8 is a data flow diagram illustrating a flexible HARQ method consistent with embodiments disclosed herein.

FIGS. 7 to 8 show an enhanced DCI format and application of the format to HARQ retransmission.

FIG. 7 shows a DCI format that can be used with HARQ retransmission with a shared medium. In one embodiment, cross-cc data retransmission in LTE-U is enabled, which can reduce retransmission latency. A new DCI format (referred to herein as DCI Format X) is used for the scheduling of one PDSCH codeword in one LTE-U cell. In some embodiments, a new field is added to existing DCI formats supported by LTE system.

In one embodiment, the following information can be transmitted by means of DCI format X: carrier indicator field 1 (702), carrier indicator field 2 (704), new data indicator (708) and HARQ process number (706). Additional data 710 and CRC bits 712 can also be included.

A carrier indicator field 1 (702) can include 0 or M bits, where M is a fixed value depending on the number of CCs on unlicensed bands. This field can be used to indicate the component carrier (CC) for which the assigned PDSCH transmission is used for HARQ operation. In an alternative embodiment, on CIF1, the CIF can indicate the carrier scheduled for the initial transmission. Therefore, it can indicate any carrier in the configured CC.

A carrier Indicator field 2 (704) can include 0 or N bits. This field can be used to indicate the CC where the assigned PDSCH transmission is intended. Therefore, it may be the same as a CIF in long term evolution release specification 10-CA (LTE Rel-10 CA). Moreover, N>=M to support of data retransmission on configured CCs, irrespective of it being on licensed bands or not.

A new data indicator (NDI) 708 can include 1 bit. The new data indicator can indicate the assigned PDSCH is new data or retransmission. This field can be optional in the new DCI format A HARQ process number (706) can include two different cases. In a case 1, the assigned PDSCH transmitted on CC indicated in CIF2 is used for PDSCH retransmission for other CC indicated in CIF1. When the two values indicated by CIF1 and CIF 2 are different, or alternatively the detected CIF1 value is not equal to a predefined value (e.g. '000'), then this field indicates the HARQ process number associated with CC indicated by CIF1. A UE can assume the detected NDI is set to indicate data retransmission (acting as virtual CRC bit).

In a case 2, a new data transmission on CC is indicated by CIF2. When the two values indicated by CIF1 and CIF2 are identical, or the detected CIF1 value is equal to a predefined value (e.g. '000'), the HARQ process field indicates the HARQ process number associated with CC indicated by CIF2. A UE can assume the detected NDI is set to indicate new data transmission.

Depending on the embodiment, the presence of this field can be UE-specific configured by RRC signaling for each serving cell or, always present in the new DCI format intended for any secondary carrier (such as eNB that provides an SCell) on unlicensed frequency band.

In one embodiment, the new DCI format is enabled to be transmitted on UE-specific search space (USS) only. A search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by:

$$L\{(Y_k + m') \bmod \lfloor N_{CCE,k}/L \rfloor\} + i$$

where $Y_k$ is defined below, i=0, ..., L-1 and $N_{CCE,k}$ is the total number of CCEs in the control region of subframe K. For the UE specific search space, for the serving cell on which PDCCH is monitored, for LTE-U capable UE, $m' = m + M^{(L)} \cdot n_{CI}$ where $n_{CI}$ is the carrier indicator field value indicated by CIF1 field, or CIF2 field or both of them.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, A=39827, D=65537, and $k = \lfloor n_s/2 \rfloor$, $n_s$ is the slot number within a radio frame. The RNTI value used for is defined in downlink and in uplink, respectively.

Alternatively, the existing search space operation can be reused by using ServCellIndex which can be equivalent to CIF2. For the UE-specific search space In one embodiment, the following configurations are present. (1) 3 CCs are configured for one LTE-U capable UE, indexing from CC0 to CC1. CC0 is on a licensed band while CC1 and CC2 are located on unlicensed band. (2) PDSCH on subframe n on CC1 (unlicensed band) is failure decoding, which is associated with HARQ process number #5. (3) According to HARQ-ACK timing, the retransmission is enabled to start from subframe n+k(k>=8). (4) N=M=2. (5) The association between CIF and CC is preconfigured via RRC signaling as following:

TABLE 1

Association Between CIF and CC

| CC Index | CIF1 | CIF2 |
|----------|------|------|
| CC0      | 00   | 00   |
| CC1      | 01   | 01   |
| CC2      | 10   | 10   |

An eNB can perform cross-cc retransmission for PDSCH by setting the new DCI format fields as illustrated in FIG. 8. In a first transmission 804, a licensed band CC0 transmits PDCCH indicating the initial transmission 816 will be in CC1 of the unlicensed bands 814 (indicated by CIF1 and CIF2 equal to 01 in reference to CC1 from the table above). However, the initial transmission 816 fails to decode.

In a second transmission 808, CC1 is busy 812. The eNB that provides the primary carrier and PCell for CC0 schedules a first retransmission 818 in CC2. CIF1 remains the same (CIF1=01) to indicate the first CC on which transmission was attempted. CIF2 indicates a retransmission on CC2 (as CIF2=10 indicates CC2 from the table above). The HARQ process id (HPI) of 5 indicates it is a retransmission of initial transmission 816 which shares the same HPI. However, retransmission 818 fails to decode.

During a next retransmission window, both CC1 and CC2 are busy 812. As both CC1 and CC2 are busy, a third transmission 810 occurs in CC0 802. CIF1 remains the same (CIF1=01) to indicate the first CC on which transmission was attempted. CIF2 indicates a retransmission on CC0 (as CIF2=00—indicates CC0 from the table above). The HARQ process id (HPI) of 5 indicates it is a retransmission of initial transmission 816 which shares the same HPI. Retransmission 820 decodes.

In another embodiment, the extend HARQ process IDs (HPI) are used. For example, if the configured number of carriers are 5, the number of HARQ process is 5 multiplied by the number of HARQ processes per each carrier (i.e. the total number of HARQ processes). The extended HARQ process ID is included in DCI format associated to the primary carrier or the cell characterized to LTE-licensed bands because cross carrier retransmission will be transmitted in LTE-licensed band.

Figure 9:
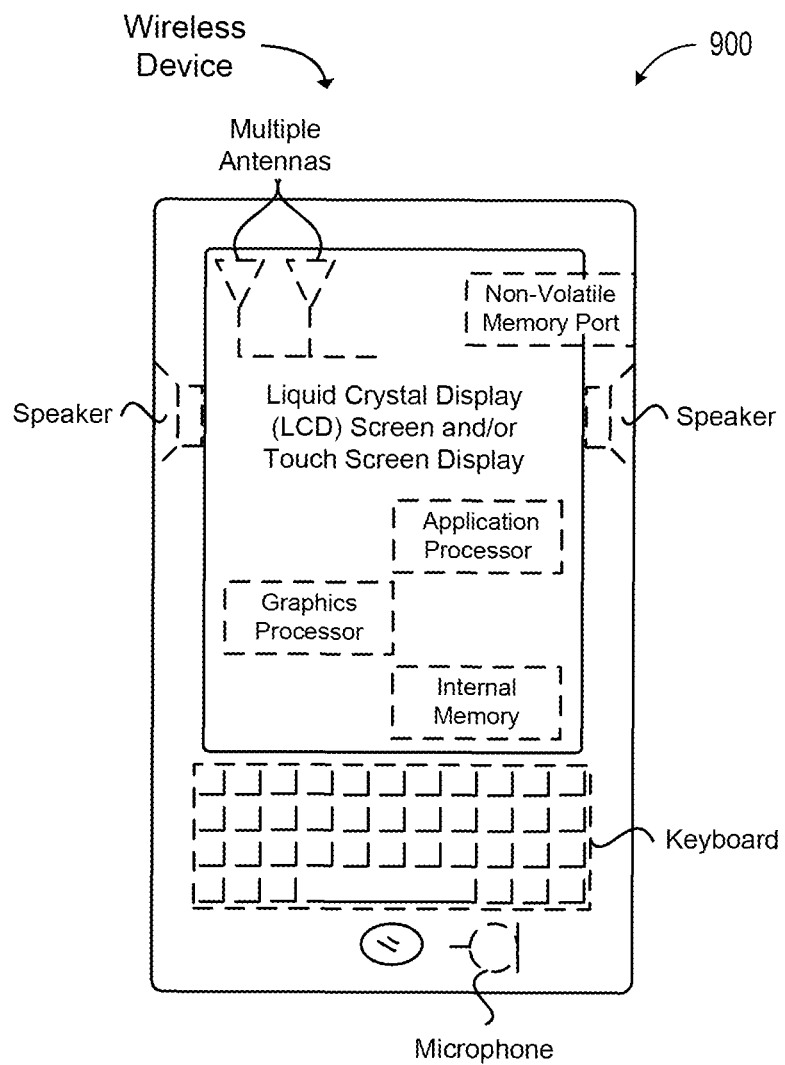
FIG. 9 is a diagram of a mobile device consistent with embodiments disclosed herein.

FIG. 9 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 9 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is an enhanced node B (eNB) for cross-carrier retransmission comprising a first wireless transceiver, a second wireless transceiver and a processor. The first wireless transceiver is configured for communication over a first set of frequencies. The second wireless transceiver configured for communication over a second set of frequencies. The processor is configured to send a transmission of data over a secondary component carrier within the first set of frequencies to a mobile device. The processor is further configured to receive a message indicating an error receiving the transmission by the mobile device. The processor is also configured to determine that the first set of frequencies are occupied by other transmissions. The processor is further configured to send a retransmission of the data over a primary component carrier within the second set of frequencies.

In Example 2, the eNB of Example 1 can optionally use an unlicensed set of frequencies as the first set of frequencies.

In Example 3, eNB of Examples 1-2 can optionally use a licensed set of frequencies as the second set of frequencies.

In Example 4, the eNB in Examples 1-3 can optionally share the first set of frequencies with another radio access technology (RAT).

In Example 5, the eNB Examples 1-4 can optionally include a third wireless interface configured for transmissions over a third set of frequencies to the mobile device. The processor is also optionally configured to receive a second message indicating a second error receiving the retransmission. The processor is optionally further configured to determine that the first set of frequencies and the second set of frequencies are busy. The processor is also optionally configured to send a second retransmission over the third set of frequencies.

In Example 6, eNB in Examples 1-5 the processor can optionally be further configured to send a schedule indicating the retransmission of the transmission will be over the second set of frequencies.

In Example 7, the first wireless interface of Examples 1-6 can optionally be a long term evolution (LTE) interface and the second wireless interface is a WLAN interface.

In Example 8 is a first base station for cross-carrier retransmission configured to communicate scheduling information for transmission of a subpacket to a user equipment (UE) over a secondary carrier using a second frequency band. The first base station is further configured to communicate the scheduling information for transmission of the subpacket to a second base station configured to communicate with the UE over the secondary carrier using the second frequency band. The first base station is also configured to receive a message from the UE indicating an error receiving the subpacket from the second base station. The first base station is further configured to determine that the second base station is unable to communicate with the UE over the secondary carrier using the second frequency band based at least in part on the second frequency band determined to be busy. The first base station is also configured to send a retransmission of the subpacket to the UE over a primary carrier using a first frequency band.

In Example 9, the first base station of Example 8 can optionally be configured to receive a message from the second base station that the second frequency band is busy.

In Example 10, the first base station of Example 8-9 can optionally be configured to receive a message from the UE that the second frequency band is busy.

In Example 11, the first base station of Example 8-10 can optionally be configured to send scheduling information over the first frequency band.

In Example 12, the first base station of Example 8-11 can optionally be configured to cause the second base station to send the scheduling information over the secondary carrier.

In Example 13, the first base station of Examples 8-12 can optionally be configured to cause a third base station to send the scheduling information in a third frequency band.

In Example 14, the first base station of Examples 8-13 can optionally be configured to cause a third base station to send a second retransmission in a third frequency band.

In Example 15, the first base station of Example 8-14 can optionally be configured to perform a listen before talk (LBT) protocol to determine that the second frequency band is busy.

Example 16 is a method of retransmission comprising sending data through a first physical downlink shared channel (PDSCH) transmission over a first frequency band to user equipment (UE). The method can also include receiving a hybrid automatic repeat request (HARQ) message indicating an error in receiving the PDSCH transmission. The method can further include sending the data through a second PDSCH transmission over a second frequency band.

In Example 17, the method of Example 16 can optionally include retransmitting the data over the second wireless medium according to a semi-static configuration.

In Example 18, the method of Examples 16-17 can optionally include retransmitting the data over the second wireless medium according to a static configuration that dictates retransmission over the second wireless medium.

In Example 19, the method of Examples 16-18 can optionally include dynamically determining placement of a retransmission of the data over a wireless medium from a set of wireless mediums based at least in part on which wireless mediums from the set of wireless mediums are busy.

In Example 20, the method of Example 16-19 can optionally include sending the data over the second wireless medium further comprises sending the data over the second wireless medium and a third medium in parallel.

In Example 21, the method of Examples 16-20 can optionally include determining that the first wireless medium is busy.

In Example 22, the method of Examples 19-21 can optionally include sending a DCI format comprising a first component carrier (CC) indicator for an assigned transmission for a HARQ operation, a second CC indicator where an assigned PDSCH transmission is intended, an indicator of whether data is new or retransmitted, or a HARQ process number.

Example 23 is a method for cross-carrier retransmission comprising sending a transmission of data over a secondary carrier within the first set of frequencies to a mobile device. The method further includes receiving a message indicating an error receiving the transmission by the mobile device. The method also includes determining that the first set of frequencies are unavailable for communication. The method further includes sending a retransmission of the data over a primary carrier within the second set of frequencies.

In Example 24, the first set of frequencies of Example 23 can optionally include an unlicensed set of frequencies.

In Example 25, the second set of frequencies of Examples 23-24 can optionally include a licensed set of frequencies.

In Example 26, the first set of frequencies of Example 23-25 can optionally be shared with another radio access technology (RAT).

In Example 27, the method of Example 23-26 can optionally include receiving a second message indicating a second error receiving the retransmission. The method can also optionally include determining that the first set of frequencies and the second set of frequencies are busy and send a second retransmission over a third set of frequencies.

In Example 28, method in Examples 23-27 can optionally include sending a schedule indicating the retransmission of the transmission will be over the second set of frequencies.

In Example 29, method of Examples 25-28 can optionally include sending the retransmission over a long term evolution (LTE) interface and sending the transmission over a long term evolution in unlicensed spectrum (LTE-U) interface.

Example 30 is a method for cross-carrier retransmission that includes communicating scheduling information for transmission of a subpacket to a user equipment (UE) over a secondary carrier using a second frequency band. The method further includes communicating the scheduling information for transmission of the subpacket to a second base station configured to communicate with the UE over the secondary carrier using the second frequency band. The method also includes receiving a message from the UE indicating an error receiving the subpacket from the second base station. The method further includes determining that the second base station is unable to communicate with the UE over the secondary carrier using the second frequency band based at least in part on the second frequency band determined to be busy. The method also includes sending a retransmission of the subpacket to the UE over a primary carrier using a first frequency band.

In Example 31, the method of Examples 30 can optionally include receiving a message from the second base station that the second frequency band is busy.

In Example 32, the method of Examples 30-31 can optionally include receiving a message from the UE that the second frequency band is busy.

In Example 33, the method of Examples 30-32 can optionally include sending scheduling information over the first frequency band.

In Example 34, the method of Examples 30-33 can optionally include causing the second base station to send the scheduling information over the secondary carrier.

In Example 35, the method of Examples 30-34 can optionally include causing a third base station to send the scheduling information in a third frequency band.

In Example 36, the method of Examples 30-35 can optionally include causing a third base station to send a second retransmission in a third frequency band.

In Example 37, the method of Examples 30-36 can optionally include performing a listen before talk (LBT) protocol to determine that the second frequency band is busy.

In Example 38, an apparatus can perform the methods as described in any of Examples 16-37.

In Example 37, machine readable storage includes machine-readable instructions that when executed implement a method or realize an apparatus as described in any of Examples 16-37.

A computing system can be viewed as an information passing bus that connects various components. In the embodiment shown, the computing system includes a processor having logic for processing instructions. Instructions can be stored in and/or retrieved from memory and a storage device that includes a computer-readable storage medium. Instructions and/or data can arrive from a network interface that can include wired or wireless capabilities. Instructions and/or data can also come from I/O interface that can include such things as expansion cards, secondary buses (e.g., USB, etc.), devices, etc. A user can interact with computing system though user interface devices and rendering system that allows the computer to receive and provide feedback to the user.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An enhanced node B (eNB) for cross-carrier retransmission comprising:
a first wireless transceiver configured for communication over a first set of frequencies;
a second wireless transceiver configured for communication over a second set of frequencies; and
a third wireless transceiver configured for transmissions over a third set of frequencies to the mobile device;
a processor configured to:
send a transmission of data over a secondary component carrier within the first set of frequencies to a mobile device;
receive a message indicating an error receiving the transmission by the mobile device;
determine that the first set of frequencies are occupied by other transmissions; and
send a retransmission of the data over a primary component carrier within the second set of frequencies
receive a second message indicating a second error receiving the retransmission;
determine that the first set of frequencies and the second set of frequencies are busy; and
send a second retransmission over the third set of frequencies.

2. The eNB of claim 1, wherein the first set of frequencies is an unlicensed set of frequencies.

3. The eNB of claim 1, wherein the second set of frequencies is a licensed set of frequencies.

4. The eNB of claim 1, wherein the first set of frequencies is shared with another radio access technology (RAT).

5. The eNB of claim 1, wherein the processor is further configured to send a schedule indicating the retransmission of the transmission will be over the second set of frequencies.

6. The eNB of claim 1, wherein the first wireless transceiver is a long term evolution (LTE) interface and the second wireless transceiver is a WLAN interface.

7. A first base station for cross-carrier retransmission configured to:
communicate scheduling information for transmission of a subpacket to a user equipment (UE) over a secondary carrier using a second frequency band and a wireless local area network (WLAN) protocol;
communicate the scheduling information for transmission of the subpacket to a second base station configured to communicate with the UE over the secondary carrier using the second frequency band and the WLAN protocol;
receive a message from the UE indicating an error receiving the subpacket from the second base station;
receive a message from the second base station indicating that the second frequency band is occupied with a transmission based at least in part on a WLAN listen before talk (LBT) protocol;
determine that the second base station is unable to communicate a retransmission with the UE over the secondary carrier using the second frequency band based at least in part on the second frequency band determined to be in use with the transmission; and
send a retransmission of the subpacket to the UE over a primary carrier using a first frequency band.

8. The first base station of claim 7, wherein to determine that the second base station is unable to communicate with the UE over the secondary carrier using the second frequency band based at least in part on the second frequency band determined to be occupied further comprises to receive a message from the second base station that the second frequency band is occupied.

9. The first base station of claim 7, wherein to determine that the second base station is unable to communicate with the UE over the secondary carrier using the second frequency band based at least in part on the second frequency band determined to be occupied further comprises to receive a message from the UE that the second frequency band is occupied.

10. The first base station of claim 7, wherein the first base station is further configured to send scheduling information over the first frequency band.

11. The first base station of claim 7, wherein to communicate scheduling information for transmission of a sub-packet to a user equipment (UE) further comprises to cause the second base station to send the scheduling information over the secondary carrier.

12. The first base station of claim 7, wherein to communicate scheduling information for transmission of a sub-packet to a user equipment (UE) further comprises to cause a third base station to send the scheduling information in a third frequency band.

13. The first base station of claim 7, wherein the first base station is further configured to cause a third base station to send a second retransmission in a third frequency band.

14. The first base station of claim 7, wherein to determine that the second base station is unable to communicate with the UE further comprises to perform a listen before talk (LBT) protocol to determine that the second frequency band is occupied.

15. A method of retransmission comprising:
sending data through a first physical downlink shared channel (PDSCH) transmission over a first frequency band to user equipment (UE), the first frequency band shared with another radio access technology;
sending a DCI format comprising a first component carrier (CC) indicator for an assigned transmission for a HARQ operation, a second CC indicator where an assigned PDSCH transmission is intended, an indicator of whether data is new or retransmitted, or a HARQ process number;
receiving a hybrid automatic repeat request (HARQ) message from the UE over a second frequency band indicating an error in receiving the PDSCH transmission;
determining that the first wireless medium is in use with another transmission; and
when determined that the first wireless medium is in use with another transmission, sending the data through a second PDSCH transmission over a second frequency band and a third frequency band in parallel.

16. The method of claim 15, further comprising retransmitting the data over the second frequency band according to a semi-static configuration.

17. The method of claim 15, further comprising retransmitting the data over the second frequency band according to a static configuration that dictates retransmission over the second frequency band.

18. The method of claim 15, further comprising dynamically determining placement of a retransmission of the data over a frequency band from a set of frequency bands based at least in part on which frequency bands from the set of frequency bands are occupied.

* * * * *